United States Patent

Scherer et al.

[11] Patent Number: 5,819,705
[45] Date of Patent: Oct. 13, 1998

[54] PROCESS AND SYSTEM FOR CONTROLLING A MOTOR VEHICLE DIESEL ENGINE

[75] Inventors: Fritz Scherer, Unterensingen; Wolfram Schmid, Eislingen, both of Germany

[73] Assignee: Mercedes-Benz AG, Germany

[21] Appl. No.: 740,002

[22] Filed: Oct. 23, 1996

[30] Foreign Application Priority Data

Oct. 27, 1995 [DE] Germany .............. 195 40 061.5

[51] Int. Cl.⁶ .............................................. F02D 41/40
[52] U.S. Cl. ............................. 123/357; 123/179.17
[58] Field of Search ................. 123/357, 358, 123/179.17

[56] References Cited

U.S. PATENT DOCUMENTS

| | | | |
|---|---|---|---|
| 5,293,853 | 3/1994 | Berger et al. | 123/357 |
| 5,315,977 | 5/1994 | Fosseen | 123/357 |
| 5,323,746 | 6/1994 | Best et al. | 123/357 |
| 5,339,781 | 8/1994 | Osawa | 123/357 |

FOREIGN PATENT DOCUMENTS 39 28 875 A1  3/1991  Germany .

*Primary Examiner*—Thomas N. Moulis
*Attorney, Agent, or Firm*—Evenson, McKeown, Edwards & Lenahan, P.L.L.C.

[57] ABSTRACT

Process and arrangement for controlling a motor vehicle diesel engine in which the fuel injection is limited as a function of a characteristic power limitation diagram and of a characteristic smoke diagram. As a function of the engaged transmission shifting position and/or of the vehicle speed, either a characteristic normal-operation smoke diagram or a correspondingly different characteristic starting-operation smoke diagram which, at a given rotational engine speed, permits larger injection quantity, are used as the injection-quantity-limiting characteristic smoke diagram. As a result, a favorable acceleration performance is achieved, particularly during the start of engines with a relatively small displacement.

6 Claims, 1 Drawing Sheet

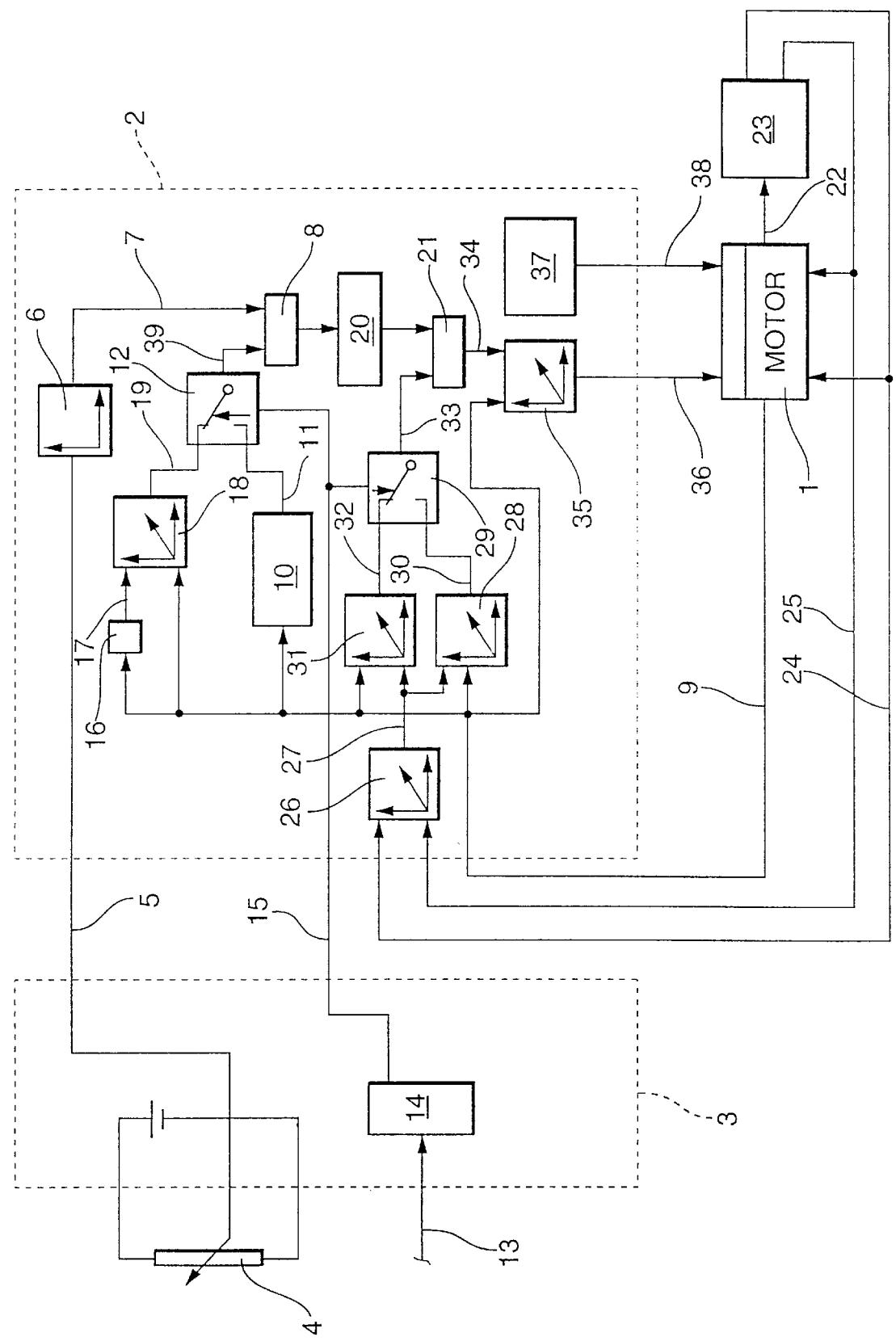

PROCESS AND SYSTEM FOR CONTROLLING A MOTOR VEHICLE DIESEL ENGINE

BACKGROUND AND SUMMARY OF THE INVENTION

The present invention relates to a process for controlling a diesel engine of a motor vehicle in which the fuel injection is limited as a function of a characteristic power limitation diagram and of a characteristic smoke diagram as well as to a system suitable for implementation of the process.

In particular, the system comprises the smoke emission limitation stage comprising two smoke emission limitation partial stages arranged in parallel, one of which is a normal-operation smoke emission limitation partial stage using a characteristic normal-operation smoke diagram to determine a smoke-emission-limiting normal-operation engine torque limit value, and another of which is a starting-operation smoke emission limitation partial stage using a characteristic starting-operation smoke diagram to determine a smoke-emission-limiting starting-operation engine torque limit value, and further comprising a switch for selecting one of the smoke-emission-limiting normal-operation engine torque limit value and the smoke-emission-limiting starting-operation engine torque limit value as the output signal of the smoke emission limitation step, the switch being controlled by at least one of output signal of a shifting position recognition unit and a vehicle speed recognition unit as a function of at least one of the engaged transmission shifting position and the vehicle speed.

A process and an arrangement for controlling a diesel engine are described in DE 39 28 875 A1. A torque limitation step which indicates a first fuel quantity limit value by a characteristic torque limitation curve; a smoke emission limitation step which indicates a second fuel quantity limit value by a characteristic smoke diagram; and a third step which indicates a third fuel quantity limit value as a function of the rotational speed and of the actual value of the injection start are arranged in parallel. A following minimal selection step selects the smallest of the three given fuel quantity limit values as the limit value which is relevant for the respective injection operation and limits the actual injection quantity in the upward direction. It is known that the characteristic smoke diagram is used for further reducing the largest possible injection quantity in transient operating conditions which, in the steady-state operation is generally determined by the characteristic torque limitation curve, in order to avoid a development of smoke.

In some situations, this type of known engine timing via a characteristic power limitation diagram and a characteristic smoke diagram leads to unsatisfactory results, for example, during a start from an idling speed, particularly in a vehicle with a high weight on a gradient and a relatively low displacement engine. The reason is that, during a start from the idling speed, no charge pressure or only little charge pressure has built up so that, because of the low idling speed and the relatively small displacement, the rate of air flow is very low which, in turn, has the result that the characteristic smoke diagram releases only a low injection quantity. As a result, relatively little torque is generated during the start so that the acceleration performance from the stopped position is unsatisfactory.

An object of the present invention is to provide a process and an arrangement to control, in particular, a diesel engine with a relatively small displacement and a low idling speed, such that the engine has a satisfactory starting performance.

This object has been achieved in accordance with the present invention by a process which, as a function of at least one of engaged transmission shifting position and of vehicle speed, a characteristic normal-operation smoke diagram or a characteristic starting-operation smoke diagram, depending on a function of at least one of the engaged transmission shifting position and the vehicle speed, is used as an injection-quantity limiting characteristic smoke diagram. The characteristic starting-operation smoke diagram permits a larger injection quantity for any particular engine rotational speed than the characteristic normal-operation smoke diagram.

Also, an arrangement in accordance with the present invention the smoke emission limitation stage comprising two smoke emission limitation partial stages arranged in parallel, one of which is a normal-operation smoke emission limitation partial stage using a characteristic normal-operation smoke diagram to determine a smoke-emission-limiting normal-operation engine torque limit value, and another of which is a starting-operation smoke emission limitation partial stage using a characteristic starting-operation smoke diagram to determine a smoke-emission-limiting starting-operation engine torque limit value, and further comprising a switch for selecting one of the smoke-emission-limiting normal-operation engine torque limit value and the smoke-emission-limiting starting-operation engine torque limit value as the output signal of the smoke emission limitation step, the switch being controlled by at least one of output signal of a shifting position recognition unit and a vehicle speed recognition unit as a function of at least one of the engaged transmission shifting position and the vehicle speed.

In the process and arrangement of the present invention, the smoke-emission-based engine torque limitation takes place as a function of the engaged transmission shifting position and/or the vehicle speed either by a characteristic normal-operation smoke diagram or by a characteristic starting-operation smoke diagram which, at a given rotational engine speed, permits a higher injection quantity in comparison to the characteristic normal-operation smoke diagram. As a result, in the starting operation, which is recognized by the engagement of a low transmission shifting position and/or the vehicle speed being under a given low limit speed, the characteristic starting-operation smoke diagram temporarily permits a larger injection quantity than by the characteristic normal-operation smoke diagram otherwise used in the normal operation in order to ensure a satisfactory starting acceleration even for an engine with a small displacement and a low idling speed without the occurrence of excessive smoke emissions in the normal operation.

According to a further aspect of the present invention, for switching over the characteristic smoke diagram, an analogous switch-over is provided between a characteristic normal-operation power limitation diagram and a respectively different characteristic starting-operation power limitation diagram, which is used especially at the start, permitting a larger injection quantity when the rotational engine speed is given. As a result, because of the switch-over to the characteristic starting-operation power limitation diagram, the power limitation measure during the start permits a further increased injection quantity in order to increase the engine torque and, therefore, tractive force for the start when the low transmission shifting position is engaged and/or at a low vehicle speed.

Another advantageous aspect of the process according to the present invention is that the characteristic starting-operation smoke diagram and, if provided the characteristic starting-operation power limitation diagram, are used especially in those driving operation phases as fuel-injection-limiting diagrams in which the lowest transmission shifting position is engaged which, for example, can be determined by a corresponding shifting position sensor system.

BRIEF DESCRIPTION OF THE DRAWING

These and other objects, features and advantages of the present invention will become more readily apparent from the following detailed description of the drawing wherein:

The sole FIGURE shows a block diagram of an arrangement for controlling a motor vehicle diesel engine in accordance with the present invention.

DETAILED DESCRIPTION OF THE DRAWING

The arrangement for controlling a diesel engine or motor 1 of a motor vehicle comprises an engine-side engine timing unit designated generally by numeral 2 and a vehicle-side engine control unit designated generally by numeral 3. The latter comprises the respective position of an accelerator pedal via an accelerator pedal potentiometer 4 and an accelerator-pedal-dependent voltage signal 5 to a requested-torque indicating section 6 in the engine timing unit 2 which, by way of an appropriately indicated characteristic curve, determines the engine torque pertaining to the respective accelerator pedal position and thus requested by the driver and transmits it as a requested-torque signal 7 to a minimal selection unit 8.

A power-limiting engine torque limit value signal 39 is a second input to the minimal selection unit 8. On the engine 1, the rotational engine speed is sensed and is supplied as the rotational engine speed signal 9 to the engine timing unit 2 where it is used, among other things, as an input signal of a power limitation step which consists of a normal-operation power limitation partial stage 10 and a starting-operation power limitation partial stage 16, 18 arranged in parallel thereto as well as a controllable switch 12 which follows and which, in a switchable manner, allows either the output signal 11 of the normal-operation power limitation partial stage 10 to pass or allows the output signal 19 of the starting-operation power limitation partial stage 16, 18 to pass for providing the power-limiting engine torque limit value signal 39 which therefor forms the output signal of the power limitation stage. The normal-operation power limitation partial section 10 determines, with a given characteristic normal-operation power limitation diagram, a power-limiting normal-operation engine torque limit value and supplies the corresponding signal 11 to a first input of the switch 12.

The starting-operation power limitation partial stage comprises a differentiator 16 which forms the rotational engine speed gradient from the supplied rotational engine speed information 9, as well as a unit 18 which, as a function of the rotational speed information 9 and of the rotational speed gradient information 17 supplied by the differentiator 16, forms, with an appropriately given characteristic starting-operation power limitation diagram, a power limiting engine torque limit value for the starting operation. Thereby, the characteristic starting-operation power limitation diagram, when the rotational engine speed is given, permits a larger engine torque limit value than the characteristic normal-operation power limitation diagram of the normal-operation power limitation partial stage 10. The corresponding output signal 19, which contains the information concerning the power-limiting engine torque limit value in the starting operation, is supplied to the other input of the switch 12.

For the transmission either of the power-limiting normal-operation engine torque limit value 11 or of the power-limiting starting-operation engine torque limit value 19 as the output signal 39 of the power limitation step, the switch 12 is controlled by the output signal 15 of a shifting-position recognition unit 14 of the engine control unit 3 which, with a shifting-position signal 13 coming from the transmission recognizes whether the lowest first transmission shifting position is engaged. When the lowest transmission shifting position is engaged, the switch 12 is controlled into the illustrated position in which the power-limitating starting-operation engine torque limit value 19 forms the output signal 39 of the power limitation stage.

If, in contrast, another transmission shifting position is engaged, the switch 12 is in the other position so that the power-limiting normal-operation limit value 11 is used as an output signal 39 of the power limitation stage. In each case, the output signal 39 of the power limitation step is compared by the minimal selection unit 8 with the torque 7 desired by the driver, and the minimal selection unit 8 transmits the lower value thereof to a unit 20 carrying out rotational speed control functions which, in turn, transmits it to a second minimal selection unit 21. For the purpose of preventing smoke, a smoke-emission-limiting engine torque limit value 33 is supplied to a second input of this additional minimal selection unit 21. The engine torque limit value 33 is obtained by a smoke emission limitation stage.

On the input side, the smoke emission limiting stage contains an air mass determination unit 26 which determines the respective air mass as a function of a supplied charge air pressure signal 24 and of a supplied charge temperature signal 25 by way of a correspondingly given characteristic diagram and emits this value as an air mass signal 27. The charge pressure signal 24 and the charge temperature signal 25 are generated by a corresponding unit 23 to which the exhaust gas volume 22 is supplied by the engine 1, whereby the information is guided by way of the charge pressure 24 and the charge temperature 25, in addition, to the engine 1 itself.

The air mass signal 27 is supplied to a normal-operation smoke limitation partial stage 28 as well as to a starting-operation smoke limitation partial stage 31 arranged parallel thereto to which, in addition, the respective rotational engine speed information 9 is supplied on the input side. Following the two partial stages 28, 31, the smoke emission limitation stage contains a controllable switch 29 which selects either the output signal 30 of the one partial stage 28 or the output signal 32 of the other smoke emission limitation partial stage 31 as the output signal 33 of the smoke emission limitation step which is supplied to the second minimal selection unit 21.

As a function of the rotational engine speed 9 and of the air mass 27, the normal-operation smoke emission limitation partial stage 28 determines, by way of a given characteristic normal-operation smoke diagram, a smoke-emission-limiting normal-operation engine torque limit value as corresponding output signal information 30 while analogously the starting-operation smoke emission limitation partial stage 31, as a function of the same input quantities, that is, of the engine rotational speed 9 and of the air mass 27, by way of a stored characteristic starting-operation smoke diagram, generates a smoke-emission-limiting starting-operation engine torque limit value as output signal information 32.

The characteristic starting-operation smoke diagram is selected so as, compared with the characteristic normal-operation smoke diagram in the case of a given rotational engine speed 2 and air mass 27, to permit a higher smoke-emission-limiting engine torque limit value and thus a higher injection quantity in order to prevent the starting acceleration from being limited by the smoke emission limitation during start-up to an undesirably lower value given by the characteristic normal-operation smoke diagram.

For the foregoing reason, the switch 29 of the smoke emission limitation stage, as well as the similar switch 12 of the power limitation stage, are controlled by the output signal 15 of the shifting-position recognition unit 14. This switch 29 is therefore situated in the illustrated position to allow the smoke-emission-limiting starting-operation engine torque limit value 32 to pass through as the output signal 33 of the smoke emission limitation step as soon as the shifting-position recognition unit 14 recognizes, on the basis of the shifting-position signal 13 supplied by the transmission, that the lowest transmission shifting position is engaged while the switch 29 is otherwise controlled into the other position in which the smoke-emission-limiting normal-operation engine torque limit value 30 is used as the output signal 33 of the smoke emission limitation stage.

In each case, the second minimal selection unit 21 compares the last-mentioned signal 33 with the minimum of the engine torque desired by the driver and of the power-limiting engine torque limit value and supplies the lower value as the desired engine torque value 34 to a feed angle adjusting unit 35. The first minimal selection unit 8 and the second minimal selection unit 21 therefore together form a minimal selection stage which selects the lowest engine torque value of the three engine torque values, i.e. driver-requested engine torque 7, power-limiting engine torque limit value 35 and smoke-emission-limiting engine torque limit value 33, as the desired engine torque value 34.

As a function of the supplied desired engine torque value 34 and of the also supplied engine torque rotational speed information 9, the feed angle adjusting unit 35 determines the feed angle for the fuel injection and transmits a corresponding output signal information 36 to plug-in pumps which are arranged on the engine 1. In addition, the plug-in pumps receive signal information 38 generated by a corresponding feeding start determination unit 37 of the engine timing unit 2 concerning the feeding start of the fuel injection.

During driving in the lowest transmission shifting position, a special characteristic starting-operation power limitation diagram and a special characteristic starting-operation smoke diagram are used. Each diagram permits a higher engine torque and therefore an increased fuel injection quantity compared to an otherwise used characteristic normal-operation power limitation diagram and characteristic normal-operation smoke diagram. Therefore, the arrangement according to the present invention provides better starting performance, while the operating performance is otherwise unchanged, than is possible by using only a single characteristic power limitation diagram and characteristic smoke diagram.

During vehicle starting, the driver steps on the accelerator pedal and the engine timing unit 2 generates a corresponding requested engine torque value 7. Because charge pressure does not at first exist, the full-load injection quantity is normally limited by the characteristic smoke diagram, in which case now, especially for starting, by way of an increased injection quantity is permitted by way of the characteristic starting operation smoke diagram. With a rising charge pressure, the characteristic smoke diagram continuously releases more injection quantity. When a specific higher charge pressure is exceeded, the power limitation may possibly intervene so that, by using the special characteristic starting-operation power limitation diagram in the given driving situation, more injection quantity is permitted than in the normal operation when driving in a higher transmission shifting position by the use of the characteristic normal-operation power limitation diagram. As a result, for starting in the lowest transmission shifting position, a comparatively high traction force level is provided by the engine 1. The provision of the characteristic diagram switch-over between the starting operation and the normal operation can therefore definitely partially compensate for the inherent poorer starting performance of engines with a smaller displacement.

For implementing the described process in the form of the illustrated arrangement, in contrast to conventional engine controls without such a characteristic-diagram switch-over, no significant additional hardware expenditures are required, particularly if the shifting-position recognition unit 14 already exists, as is frequently the case for the implementation of shifting-position-dependent engine end cut-off speeds. The division of the smoke emission limitation step, as well as of the power limitation step, into the respective two parallel partial steps, as required, can, of course, only with respect to the software, take place within a single smoke-emission-limitation and/or a single power limitation component without the requirement of additional hardware for this purpose.

Although the invention has been described and illustrated in detail, it is to be clearly understood that the same is by way of illustration and example, and is not to be taken by way of limitation. For example, the characteristic starting-operation diagrams can also still be used when driving in the second-lowest transmission shifting position. As a further modification, instead of or in addition to the described characteristic-diagram switch-over the switch-over between the starting operation and the normal operation as a function of the engaged transmission shifting position can be carried out as a function of whether the vehicle speed, which in almost all vehicles is continuously sensed by a corresponding sensor system, exceeds a given limit value. When the vehicle speed is below this limit value, the characteristic starting-operation diagrams are used for the engine torque limitation and, when the vehicle speed is above the limit value, the characteristic normal-operation diagrams are used. That is, the corresponding switches 12, 29 are controlled in a corresponding vehicle-speed dependent manner.

For taking into account the vehicle speed condition as well as the transmission shifting position condition, as desired, a switch-over signal may also be used for the characteristic diagram switch-over which signal contains a logical linking of the transmission shifting position recognition signal and of the speed limit value exceeding signal. Of course, it is also within the scope of the present invention to divide only the smoke emission limitation by providing the characteristic starting-operation smoke diagram which differs from the characteristic normal-operation smoke diagram and to provide for the power limitation only a single uniform characteristic power limitation diagram for the starting operation as well as for the other normal operation. The spirit and scope of the present invention are, therefore to be limited only by the terms of the appended claims.

We claim:

1. Process for controlling a motor vehicle diesel engine, comprising the steps of limiting fuel injection as a function of a characteristic power limitation diagram and of a characteristic smoke diagram, and using as an injection-quantity limiting characteristic smoke diagram either a characteristic normal-operation smoke diagram or a characteristic starting-operation smoke diagram, depending on a function of at least one of engaged transmission shifting position and vehicle speed, the characteristic starting-operation smoke diagram differing from the characteristic normal-operation smoke diagram in that the former permits a larger injection quantity than the latter at any particular engine rotational speed.

2. The process according to claim 1, comprising the further step of using as an injection quantity limiting characteristic power limitation diagram as a function of at least one of engaged transmission shifting position and of the vehicle speed, a characteristic normal-operation power limitation diagram or a characteristic starting-operation power limitation diagram, which with of a given rotational engine speed permits the larger injection quantity.

3. The process according to claim 1, wherein at least one of the characteristic starting-operation smoke diagram and a characteristic starting-operation power limitation diagram is used as an injection-quantity-limiting characteristic diagram when the lowest transmission shift position is engaged.

4. The process according to claim 3, comprising the further step of using as an injection quantity limiting characteristic power limitation diagram as a function of at least one of engaged transmission shifting position and of the vehicle speed, a characteristic normal-operation power limitation diagram or a characteristic starting-operation power limitation diagram, which with of a given rotational engine speed permits the larger injection quantity.

5. System for controlling a motor vehicle diesel engine, comprising a power limitation stage for a characteristic-diagram-based indication of a rotational-engine-speed-dependent power-limiting engine torque limit value;

a smoke emission limitation stage for a characteristic-diagram-based indication of an air-mass and rotational-engine-speed-dependent, smoke-emission-limiting engine torque limit value; and a minimal selection stage to which at least the power-limiting engine torque limit value and the smoke-emission-limiting engine torque limit value are supplied such that the smaller of the values is selected as the relevant engine torque limit value from the supplied input values and as a function of at least one of engaged transmission shifting position and of vehicle speed, a characteristic normal-operation smoke diagram or a characteristic starting-operation smoke diagram is used as an injection-quantity limiting characteristic smoke diagram depending on a function of at least one of engaged transmission shifting position and vehicle speed, the characteristic starting-operation smoke diagram differing from the characteristic normal-operation smoke diagram in that the former permits a larger injection quantity than the latter at any particular engine rotational speed, wherein the smoke emission limitation stage comprises two smoke emission limitation partial stages arranged in parallel, one of which is a normal-operation smoke emission limitation partial stage using a characteristic normal-operation smoke diagram to determine a smoke-emission-limiting normal-operation engine torque limit value, and another of which is a starting-operation smoke emission limitation partial stage using a characteristic starting-operation smoke diagram to determine a smoke-emission-limiting starting-operation engine torque limit value, and further comprising a switch for selecting one of the smoke-emission-limiting normal-operation engine torque limit value and the smoke-emission-limiting starting-operation engine torque limit value as the output signal of the smoke emission limitation step, the switch being controlled by at least one of output signal of a shifting position recognition unit and a vehicle speed recognition unit as a function of at least one of the engaged transmission shifting position and the vehicle speed.

6. The system according to claim 5, wherein the power limitation stage comprises two power limitation partial stages arranged in parallel, of which a normal-operation power limitation partial stage is configured to use a characteristic normal-operation power limitation diagram to determine a power-limiting normal-operation engine torque limit value and a starting-operation power limitation partial stage is configured to use a characteristic starting-operation power limitation diagram, which with the given rotational engine speed permits a larger injection quantity than the characteristic normal-operation power limitation diagram, whereby a power-limiting starting operation engine torque limit value is determined, and a switch for selecting one of an output signal of the normal-operation power limitation partial stage or an output signal of the starting-operation power limitation partial stage as an output signal of the power limitation stage, whereby the second-mentioned switch is controlled by an output signal of at least one of the shifting position recognition unit and the driving speed recognition unit as a function of the at least one of the engaged transmission shifting position and the vehicle speed.

* * * * *